United States Patent [19]

Chiba

[11] Patent Number: 6,125,151
[45] Date of Patent: *Sep. 26, 2000

[54] CARRIER RECOVERY CIRCUIT

[75] Inventor: Kenichiro Chiba, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/611,627

[22] Filed: Mar. 6, 1996

[30] Foreign Application Priority Data

Mar. 11, 1995 [JP] Japan .................................. 7-079651

[51] Int. Cl.$^7$ .................................................. H04L 27/22
[52] U.S. Cl. ........................................ 375/326; 375/232
[58] Field of Search ..................................... 375/326, 344,
375/329, 332, 232, 230; 329/304–345;
708/322, 323

[56] References Cited

U.S. PATENT DOCUMENTS

| | | | |
|---|---|---|---|
| 3,716,807 | 2/1973 | Sha et al. .................................. | 375/232 |
| 5,090,027 | 2/1992 | Ohsawa . | |
| 5,327,459 | 7/1994 | Hara et al. .................................. | 375/232 |
| 5,414,732 | 5/1995 | Kaufmann .................................. | 375/232 |
| 5,477,534 | 12/1995 | Kusano .................................. | 370/286 |
| 5,590,121 | 12/1996 | Geigel .................................. | 375/232 |

FOREIGN PATENT DOCUMENTS

| | | |
|---|---|---|
| 2-198205 | 8/1990 | Japan . |
| 4-61534 | 2/1992 | Japan . |

OTHER PUBLICATIONS

The Institution of Electrical Engineers, Electronic Circuits and Systems, vol. 133, 1986.
European Search Report.
"Adaptive Noise Cancelling: Principles and Applications", B. Widrow et al, Proceedings of the IEEE, vol. 63, No. 12, Dec. 1975.

*Primary Examiner*—Young T. Tse
*Attorney, Agent, or Firm*—Laff, Whitesel & Saret, Ltd.; J. Warren Whitesel

[57] ABSTRACT

The invention provides a carrier recovery circuit which reduces the amount of calculation processing recovered to renew the tap coefficients of an adaptive filter to achieve improvement performance at low signal-to-noise ratio and make high speed pull in possible. Tap coefficients of variable coefficient filter 12 of adaptive line enhancer 1 are blocked into a plurality of blocks, and switches of switch circuit 14 individually corresponding to the blocks are selected by coefficient renewal control circuit 3 and renewal of the tap coefficients of the selected block is executed by adaptive algorithm circuit 13. Since all tap coefficients need not necessarily be renewed at a time in each symbol cycle, only the tap coefficients of the selected block are renewed. Thus although the adaptive speed of the adaptive emission line emphasizer decreases, the adaptive line enhancer can be constructed with a narrower band. Further, by varying the number of blocks to be selected in response to frame synchronizing information, prior to establishment of frame synchronization the number of blocks to be selected can be reduced and high speed pull in is realized.

1 Claim, 3 Drawing Sheets

| Symbol Timing | Switch Operation | | | | | |
|---|---|---|---|---|---|---|
| | S1 | S2 | S3 | ··· | Sn−1 | Sn |
| ⋮ | ⋮ | ⋮ | ⋮ | ··· | ⋮ | ⋮ |
| i−2 | 0 | 0 | 0 | ··· | 1 | 0 |
| i−1 | 0 | 0 | 0 | ··· | 0 | 1 |
| i | 1 | 0 | 0 | ··· | 0 | 0 |
| i+1 | 0 | 1 | 0 | ··· | 0 | 0 |
| i+2 | 0 | 0 | 1 | ··· | 0 | 0 |
| ⋮ | ⋮ | ⋮ | ⋮ | ··· | ⋮ | ⋮ |

0=off, 1=on

FIG. 2
PRIOR ART

| Symbol Timing | Frame Synchronization | Switch Operation | | |
|---|---|---|---|---|
| | | S1 | S2 | Sn |
| ⋮ | ⋮ | ⋮ | ⋮ | ⋮ |
| i−2 | | 1 | 0 | 0 |
| i−1 | | 1 | 0 | 0 |
| i | | 1 | 0 | 0 |
| i+1 | | 0 | 1 | 0 |
| i+2 | | 0 | 0 | 1 |
| i+1 | | 1 | 0 | 0 |
| i+2 | | 0 | 1 | 0 |
| ⋮ | ⋮ | ⋮ | ⋮ | ⋮ |

0=off, 1=on

FIG. 4

| Number of Tap Coefficients | 1 | K | K+1 | 2K | 2K+1 | 3K |
|---|---|---|---|---|---|---|
| Blocks | | B1 | | B2 | | B3 |
| Switch Numbers For Blocks | | S1 | | S2 | | S3 |

FIG. 5

CARRIER RECOVERY CIRCUIT

BACKGROUND OF THE INVENTION

1. Field of the Invention:

This invention relates to a recovery circuit for recovery a carrier from a phase modulated signal, and more particularly to a carrier recovering circuit which employs an adaptive line enhancer.

2. Description of the Related Art:

Conventionally, as a technique for recovering a carrier from a phase modulated wave using an adaptive line enhancer, a carrier regeneration circuit is disclosed in Japanese Patent Laid-Open Application No. 198205/1990 or No. 61534/1992. In the carrier recovery circuit which employs an adaptive line enhancer, a signal obtained by removing modulation components from a phase modulated signal is inputted to the adaptive line enhancer. In the adaptive emission line emphasizer, the signal successively passes through a correlation separator and an adaptive filter, whose coefficients are controlled by an adaptive algorithm circuit, to be outputted as an extracted carrier. Then, the extracted carrier is synchronized to obtain a recovery carrier. The carrier recovery circuit which employs such an adaptive line enhancer as described above can provide with superior characteristics in terms of the synchronization characteristic at a lower signal to noise ratio, improve the pull-in characteristic over a wide range, reduce the time required for pull-in and so forth compared with a former technique which employs a phase locked loop.

The carrier recovery circuit employing an adaptive line enhancer, however, has a problem in that it involves a great amount of renewal calculation processing of tap coefficients, which are coefficients for individual taps required for the coefficient control of the adaptive filter, and this makes high speed pull-in at a high transmission rate difficult. Further, where the carrier recovery circuit is implemented based on real time processing, a limitation in processing capacity of a processor such as a digital signal processor limits the number of taps of the adaptive filter. Particularly, where a signal of a high transmission rate is handled, the carrier regeneration circuit suffers from the problem that the band of the adaptive filter cannot be made sufficiently narrow because of the restriction on the number of taps and thus high synchronization stability cannot be assured at a low signal to noise ratio.

SUMMARY OF THE INVENTION

It is an object of the present invention to provide a carrier recovery circuit which reduces the amount of renewal calculation processing of the tap coefficients in an adaptive filter to achieve improvement in the performance at low signal to noise ratio and make high speed pull-in possible.

A carrier recovery circuit of the present invention is constructed such that tap coefficients of an adaptive filter provided in an adaptive line enhancer and having renewable tap coefficients are divided into a plurality of blocks and one of the blocks is selected so that renewal of the tap coefficients in the selected block is performed. In particular, a carrier recovery circuit comprises a frequency multiplier for inputting a phase modulated signal and removing modulation components of the phase modulated signal, an adaptive line enhancer for inputting the signal from which the modulation components are removed and extracting a carrier component from the inputted signal, a synchronization circuit for synchronizing the carrier extracted by the adaptive line enhancer, and a divider for dividing the synchronized carrier and outputting the divided carrier of the phase modulated signal, the adaptive line enhancer further comprising a coefficient renewal control circuit for controlling the renewal of tap coefficients of the adaptive filter. The adaptive line enhancer comprises an adaptive filter having tap coefficients divided into a plurality of blocks, an adaptive algorithm circuit for renewing the tap coefficients of the adaptive filter, and a switch circuit interposed between the adaptive filter and the adaptive algorithm circuit for selecting one of the blocks whose tap coefficients are to be renewed, the switch circuit being controlled to selectively switch in response to information inputted thereto by the coefficient renewal control circuit.

The coefficient renewal control circuit receives symbol clock information inputted thereto, sequentially selects the blocks of the adaptive filter and controls renewals of the tap coefficients of the selected blocks. Or, the coefficient renewal control circuit inputs frame synchronism information and symbol clock information, and fixedly selects, before establishment of frame synchronism, a particular one of the blocks of the adaptive filter, but successively selects, after the establishment of frame synchronization, the blocks, and controls renewal of the tap coefficients of the selected blocks.

Since the tap coefficients of the adaptive filter are divided into a plurality of blocks and the switch circuit is controlled by the coefficient renewal control circuit to select one of the blocks, all of the tap coefficients may or may not be renewed in each symbol cycle. That is only those tap coefficients within the selected block are renewed. Consequently, although the adaptive speed of the adaptive line enhancer may decrease, the adaptive line emphasizer can be constructed with a greater number of taps within the range of the finite processing capacity of a processor and thus with a narrower band.

Further, by constructing the coefficient renewal control circuit so as to operate in response to frame synchronization information, prior to establishment of frame synchronization, the number of blocks which can be selected is reduced thereby to realize high speed pull in, but after the establishment of frame synchronization, the number of blocks which can be selected is increased to narrow the band of the adaptive filter so that stability under the condition of a low signal to noise ratio can be improved.

BRIEF DESCRIPTION OF THE DRAWINGS

FIG. 2 is a table illustrating a controlling operation of a coefficient renewal control circuit in the first embodiment;

FIG. 4 is a table illustrating a controlling operation of a coefficient renewal control circuit in the second embodiment; and FIG. 5 is a table illustrating blocking of tap coefficients of a variable coefficient filter in the second embodiment.

DESCRIPTION OF THE PREFERRED EMBODIMENTS

Figure 1:
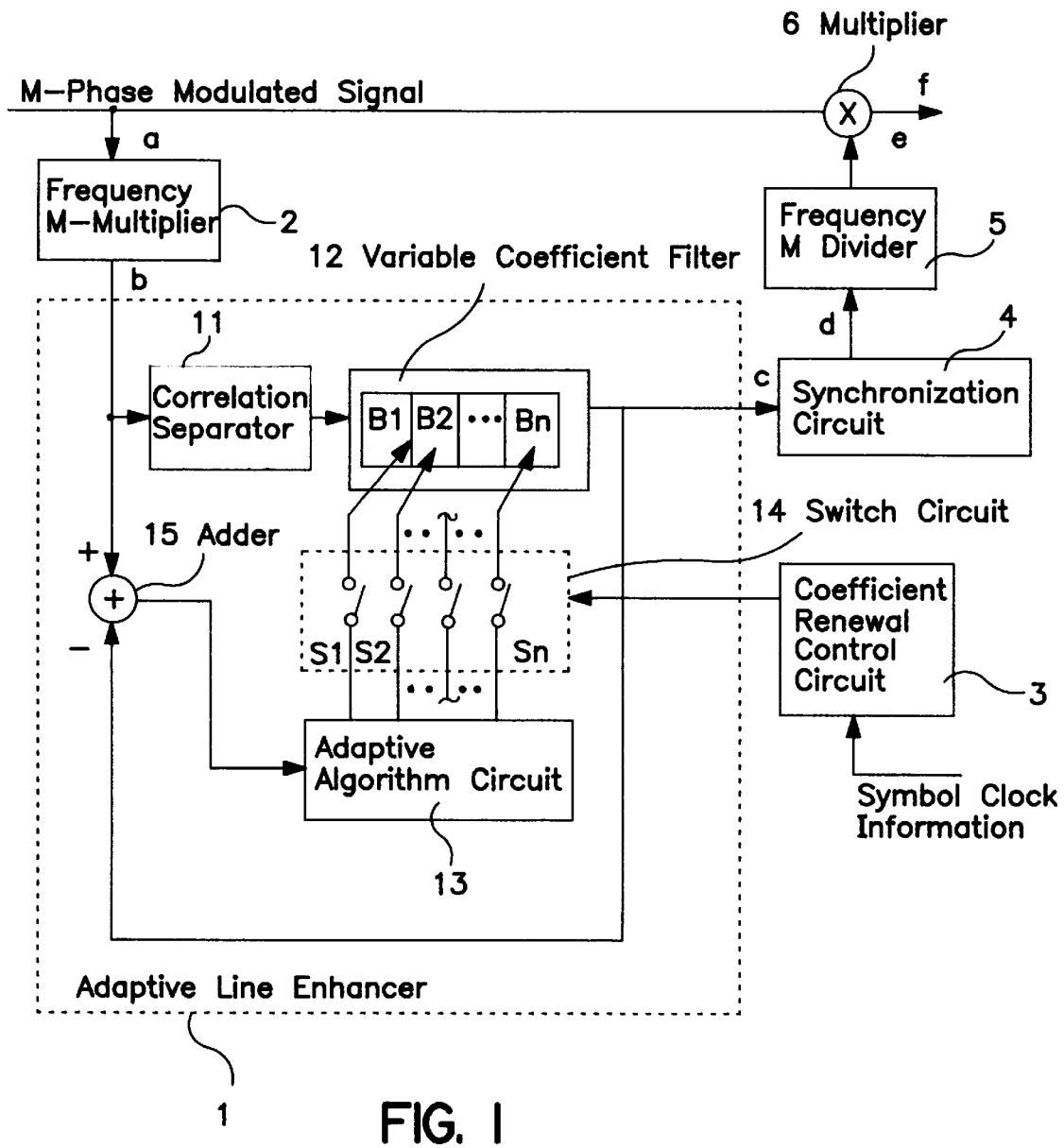
FIG. 1 is a block diagram of a first embodiment of a carrier recovery circuit of the present invention.

An embodiment of a carrier recovery circuit of the present invention is described with reference to the drawings. FIG. 1 is a block diagram of a first embodiment of the carrier recovery circuit of the present invention. M-phase phase modulated signal a is multiplied by M by frequency M multiplier 2 and inputted as signal b, from which modulation components have been removed, to adaptive line enhancer 1. Adaptive line enhancer 1 includes correlation separator 11, variable coefficient filter 12 as an adaptive filter, adaptive algorithm circuit 13 which performs renewal calculation of tap coefficients of variable coefficient filter 12, switch circuit 14 interposed between adaptive algorithm circuit 13 and variable coefficient filter 12 for selectively controlling the connection of them between on and off, and adder 15 for adding signal b and the output of variable coefficient filter 12 and outputting a result of the addition to control adaptive algorithm circuit 13. It is to be noted that the construction of adaptive line enhancer 1 described above except switch circuit 14 is disclosed in Japanese Patent Laid-Open Application No. 61534/1992 or document B. Windrow et al., "Adaptive Noise Cancelling: Principles and Applications", Proc. IEEE, Vol. 63, December, 1975.

Here, variable coefficient filter 12 has a large number of taps which are blocked into n (n is an integer equal to or greater than 2) blocks B1 to Bn, and switch circuit 14 includes switches S1 to Sn between blocks B1 to Bn and adaptive algorithm circuit 13, respectively. Switches S1 to Sn of switch circuit 14 are selectively controlled between on and off by coefficient renewal control circuit 3 provided separately from adaptive line enhancer 1 so that it can be designated for each block whether tap coefficient renewal calculation should be performed by adaptive algorithm circuit 13. Coefficient renewal control circuit 3 receives symbol clock information as an input thereto and executes the selection operation in synchronism with a tap coefficient renewal timing which appears at symbol cycle rate.

Meanwhile, extracted carrier c outputted from variable coefficient filter 12 is inputted to and synchronized by synchronization circuit 4. Synchronization circuit 4 is formed from a phase locked loop which is usually employed in a sequential control system. Further, synchronized extracted carrier d is divided by M by frequency M divider 5 and outputted as recovery carrier e of M-phase phase modulated signal a from frequency H divider 5. Multiplier 6 multiplies recovery carrier e and M-phase phase modulated signal a and outputs the resulting signal as detected signal f of M-phase phase modulated signal a.

By the construction described above, modulation components of H-phase phase modulated signal a are removed by frequency M multiplier 2, and the carrier of M-phase phase modulated signal a is extracted by adaptive line enhancer 1. Further, M-phase phase modulated signal a is synchronized with carrier d by synchronization circuit 4 and outputted as H multiplied synchronized carrier d from synchronization circuit 4. Thereafter, M multiplied carrier d is divided by M by frequency M divider 5 and outputted as recovery carrier e from frequency M divider 5 similarly as in the carrier recovery operation of the conventional carrier regeneration circuit.

In the flow described above, coefficient renewal control circuit 3 receives an input of symbol clock information and controls switch circuit 14 at each tap coefficient renewal timing, which appears at every symbol cycle, to select some of the n blocks comprising variable coefficient filter 12 so that tap coefficient renewal processing by adaptive algorithm circuit 13 may be executed only for the selected block or blocks. In the present embodiment, the n switches S1 to Sn corresponding to the n blocks B1 to Bn are selected, and the thus selected switches may be switched on or off so that renewal of the tap coefficients of those blocks to which the switches are connected is performed or not performed.

An example of control of the switch circuit by coefficient renewal control circuit 3 is illustrated in FIG. 2. Referring to FIG. 2, "1" represents an on state of a switch, and "0" represents an off state of a switch. In the example illustrated, one of switches S1 to Sn is selected so that tap coefficient renewal of the corresponding one of blocks B1 to Bn is performed. Further, the switch to be selected is successively changed at successive symbol timings from switch S1 to switch Sn.

Accordingly, in the example of control shown in FIG. 2, in each symbol cycle, the tap coefficients of only one of the n blocks are updated. Consequently, it can be recognized that the amount of tap coefficient renewal calculation required for adaptive algorithm circuit 13 is reduced to 1/n compared to that required for renewal of all taps comprising variable coefficient filter 12. Accordingly, although the adaptive speed of adaptive line 1 may drop somewhat, it become possible to adaptively control a filter having a greater number of taps within the finite processing capacity of a processor. This allows narrow-band adaptive line enhancer to be constructed and performance at low signal to noise ratios can be improved.

Figure 3:
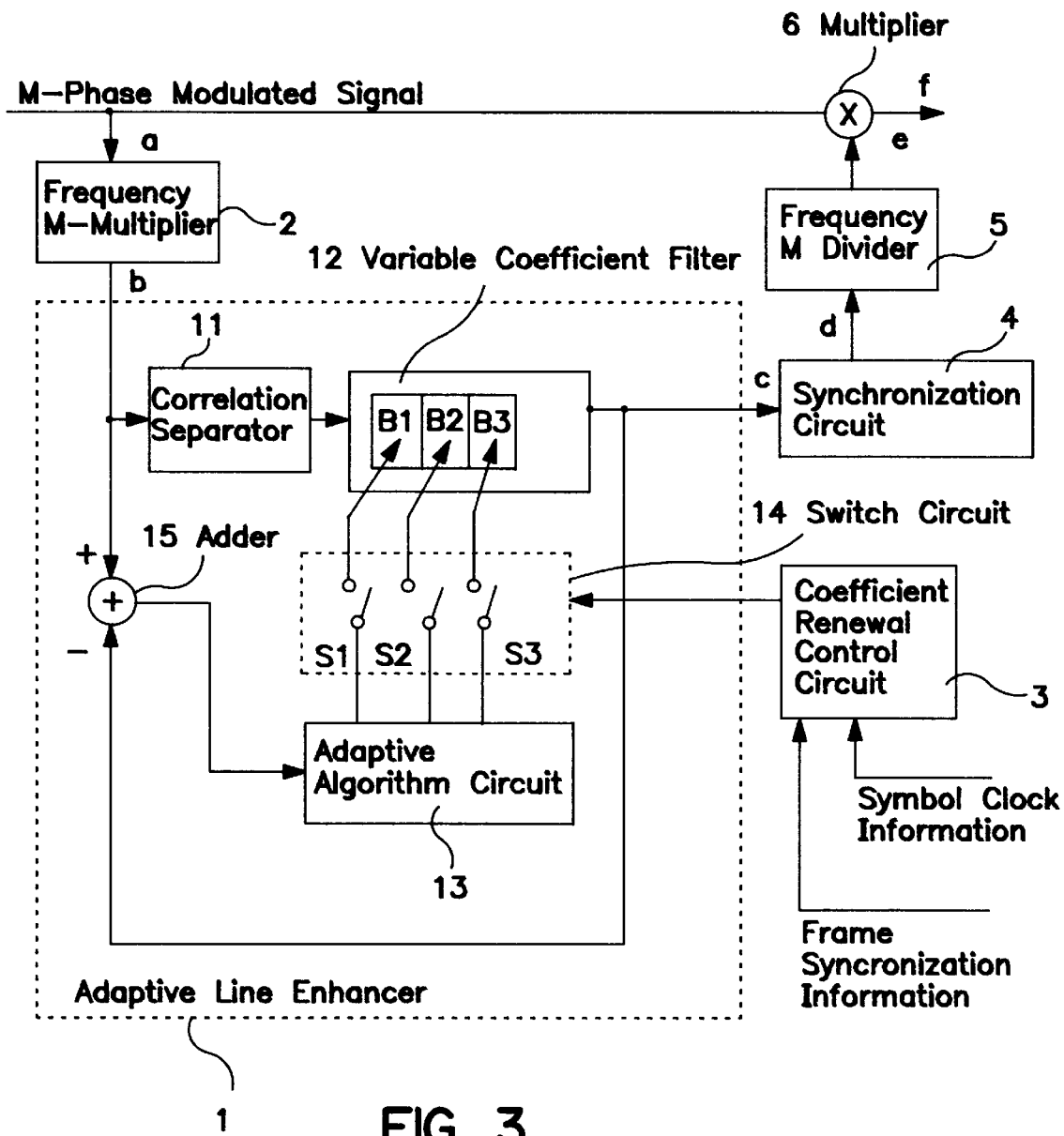
FIG. 3 is a block diagram of a second embodiment of a carrier recovery circuit of the present invention.

FIG. 3 is a block diagram of a second embodiment of the present invention, and in FIG. 3, equivalent elements to those of the first embodiment are denoted by the same reference numerals. In the present embodiment, the construction of adaptive line enhancer 1 is the same as that in the first embodiment, but the carrier recovery circuit of the present embodiment is different from that of the first embodiment in that switch circuit 14 includes three switches S1 to S3 and coefficient renewal control circuit 3 for controlling switch circuit 14 operates in response to symbol clock information and frame synchronization information. In particular, in the present second embodiment when a frame synchronization signal is inputted, coefficient renewal control circuit 3 sequentially selects, one of the switches of switch circuit 14 similarly in the first embodiment, but when no frame synchronizing signal is inputted, coefficient renewal control circuit 3 selects a fixed one of the switches.

FIG. 4 is a table illustrating an example of control of switch circuit 14 by coefficient renewal control circuit 3, and corresponding to this, FIG. 5 illustrates an example of the blocking of the tap coefficients of variable coefficient filter 12 by switches S1 to S3. In this example the total number of taps comprising variable coefficient filter 12 is represented by 3k, and the number of taps of each block is k. In the control algorithm depicted by FIG. 4, within a period before establishment of frame synchronization within which no frame synchronization signal is inputted, that is, within a period prior to symbol timing slot i, only switch S1 is normally held on while switches S2 and S3 are normally held off by the control of switch circuit 14 by coefficient renewal control circuit 3. In this instance, in variable coefficient filter 12, only block B1 shown in FIG. 5 is counted as an object of tap coefficient calculation of the filter, and blocks B2 and B3 are omitted from tap coefficient calculation.

Accordingly, before establishment of frame synchronization, since tap coefficient calculation is performed only for block B1, the adaptive line enhancer operates as an adaptive line enhancer having k taps in which all tap coefficients are renewed for each symbol. Consequently, the amount of tap coefficient calculation processing is reduced to one third, and the processing time is reduced and high speed pull in is made possible.

Meanwhile, after establishment of frame synchronization, switches S1 to S3 are successively switched on by the control of switch circuit 14 by coefficient renewal control circuit 3 so that the tap coefficients of blocks B1 to B3 are successively renewed. In other words, the carrier recovery circuit operates as an adaptive line enhancer having 3k taps which is equal to three times the tap number prior to the establishment of frame synchronization. Consequently, although the trucking speed decreases, the band of variable coefficient filter 12 is further narrowed, and the stability under low signal to noise ratio condition is improved.

Accordingly, in the second embodiment, high speed pull in is realized and in the noise resistance characteristic after completion of the pull in is improved.

Here, while, in the second embodiment, the example wherein the taps of variable coefficient filter 12 are divided into three blocks is described, the taps of variable coefficient filter 12 can be divided into an arbitrary number of blocks as described hereinabove in connection with the first embodiment. Further, while, in the embodiment described above, the example of a carrier recovery circuit of the present invention is constructed as a portion of a demodulator for a phase modulated signal, as a matter of course, the carrier recovery circuit can be formed independently.

Further, it is also possible to construct the carrier recovery circuit so that it selects, from among a plurality of blocks of the taps of the variable coefficient filter, two or more blocks at a time. It is also possible to construct the filter so that the number of taps in each block is made different among the different blocks. By the construction just described, the pull in speed or the follow-up property can be fine-turned.

As described above, according to the present invention, since taps of an adaptive filter provided in an adaptive line enhancer and having renewable tap coefficients are divided into a plurality of blocks and selected for each symbol clock so that renewal of the tap coefficients in the block are performed, all tap coefficients need not be renewed at a time in each symbol cycle. Consequently, although the adaptive speed of the adaptive line enhancer decreases, the adaptive line enhancer can be constructed with a greater number of taps within the finite processing capacity of a processor and thus with a narrower band.

Meanwhile, by constructing the carrier regeneration circuit such that frame synchronization information and symbol block information are received and, that prior to establishment of frame synchronization, a particular one of the blocks of the adaptive filter is selected fixedly, but after the establishment of frame synchronization, the blocks are successively selected for renewal, it is possible to reduce the number of the selected blocks and enable high speed pull-in, prior to the establishment of frame synchronization, conversely and increase the number of selected blocks to narrow the band of the adaptive filter and improve stability under low signal to noise ratio conditions when the frame synchronization is established.

What is claimed is:

1. A carrier recovery circuit, comprising:

a frequency multiplier for inputting a phase modulated signal and removing modulation components of the phase modulated signal;

an adaptive line enhancer comprising a variable coefficient filter having a plurality of tap coefficients divided into a plurality of blocks for inputting the signal from which the modulation components are removed and extracting a carrier component from the inputted signal;

said adaptive line enhancer further comprising an adaptive algorithm circuit for renewing the tap coefficients of said variable coefficient filter; and a switch circuit interposed between said variable coefficient filter and said adaptive algorithm circuit for selecting one of the blocks whose tap coefficients are used for the renewing;

a synchronizing circuit for synchronizing the carrier extracted by said adaptive line enhancer;

a divider for dividing the synchronized carrier and outputting a divided synchronized carrier; and a coefficient renewal control circuit for controlling a renewal to tap coefficients of the variable coefficient filter of said adaptive line enhancer;

said switch circuit being controlled to switch and make said selection of one of said blocks in response to information inputted by said coefficient renewal control circuit;

wherein said coefficient renewal control circuit inputs frame synchronization information and symbol clock information, and fixedly selects, before establishment of frame synchronization a particular one of said plurality of blocks of said variable coefficient filter, but successively selects between said blocks after the establishment of frame synchronization in a block by block order and controls renewal of the tap coefficients of the selected blocks.

* * * * *